United States Patent Office 2,983,750
Patented May 9, 1961

2,983,750
TRIS METHYLAMMONIUM SALICYLATE SALTS

Valentine F. Cotty, Westfield, and Armin G. Wilson, Highland Park, N.J., assignors to Bristol-Myers Company, New York, N.Y., a corporation of Delaware No Drawing. Filed July 3, 1959, Ser. No. 824,791

3 Claims. (Cl. 260—480)

This invention relates to novel salicylate salts, their method of manufacture and their use. More specifically, this application relates to novel compounds having the generic formula:

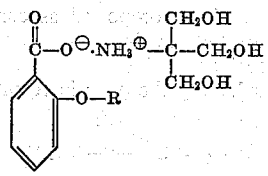

wherein R is hydrogen or the acetyl radical

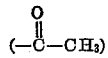

The novel compounds of this invention are named tris (hydroxymethyl) methylammonium salicylate when R is the hydrogen atom and tris (hydroxymethyl) methylammonium acetylsalicylate when R is the acetyl radical.

The tris (hydroxymethyl) methylammonium salicylate is produced by reacting tris (hydroxymethyl) methyl amine with salicylic acid. The reaction can also be brought about by employing an acid salt of the tris (hydroxymethyl) methyl amine, preferably an inorganic acid salt such as that of the hydrochloride and reacting this amine with an alkali metal or alkaline earth salt of salicylic acid such as, for example, sodium salicylate. The reaction is performed by simply heating the reactants in a suitable solvent. The reaction temperature employed is not critical and the temperature can vary from about 25° C. to about 100° C. and preferably from about 50° C. to about 80° C. It is preferable to conduct the reaction by heating or refluxing in a polar organic solvent. Illustrative of such solvents there can be mentioned alcohols such as ethanol and propanol; ketones such as acetone, methyl ethyl ketone and diethyl ketone; esters such as ethyl acetate; and other common well-known polar organic solvents such as dimethyl sulfoxide, and dimethyl formamide. The quantity of the polar organic solvent employed is not critical and can vary from about 1 to 10 liters and preferably about 2 to 5 liters for each mole of each reactant. The solid amine salts of the reaction are separated from the reaction mixture by conventional techniques such as by filtration or by centrifuging after the mixture has been cooled to about room temperature. When an alcohol is used as the reaction medium it may be necessary to add an ether such as diethyl ether to cause precipitation of the amine salts. The tris (hydroxymethyl) methylammonium acetylsalicylate is produced in the same manner as the tris (hydroxymethyl) methylammonium salicylate except that the acetic acid ester of salicylic acid (aspirin) is used as the starting material.

The compounds of this invention have utility as germicides, food preservatives and as medicinals. Thus the novel compounds of this invention can be used as analgesics, antipyretics and antirheumatics in much the same manner as acetylsalicylic acid (aspirin). However, the trihydroxy compounds of this invention possess many advantages when compared with aspirin in that they are less toxic upon oral administration, more potent as analgesics, do not cause stomach acidity upon oral administration, and are water soluble. In addition, the tris (hydroxymethyl) methylammonium salicylate does not posses the bitter taste of aspirin.

The methods employed in the human administration of the novel trihydroxy compounds of this invention is much the same as that for aspirin or the various water soluble alkali metal salts of aspirin. Thus they can be used in the conventional dosages of aspirin as tablets, powders, capsules or liquids for oral administration. Also, they can be used as the active ingredient in suppositories and salves or administered intravenously. The conventional compounding ingredients used with aspirin such as binders in the case of tablets or polyoxyethylene glycols in the case of salves and suppositories can be used with the novel trihydroxy compounds of this invention. The unit dosage or therapeutically effective quantity can vary over wide limits such as from about 0.1 grain to 10 grains. Each unit dosage can contain from about 5% to 95% of the novel analgesics by weight of the entire composition with the remainder comprising a pharmaceutical carrier.

When the novel trihydroxy compounds are used as germicides, they can be used as solutions in water or admixed with the conventional carriers such as calcium carbonate and applied topically to animals or to plants. Also they can be incorporated in paints or textiles to produce germicidal products. When the novel trihydroxy compounds are used as food preservatives, small amounts of the active compound can be sprinkled onto foods such as meats.

EXAMPLE 1

*Preparation of tris (hydroxymethyl)methylammonium salicylate*

To a mixture of 484 grams (4 mols) of tris (hydroxymethyl) methylamine and 552 grams (4 mols) of salicylic acid there was added 12 liters of ethyl acetate. This mixture was then brought to reflux while stirring. The refluxing and stirring was continued for two hours after which the reaction mixture was cooled to room temperature. The tris (hydroxymethyl) methylammonium salicylate which formed as a precipitate in the reaction mixture was filtered, washed with ethyl acetate, dried in vacuo at room temperature over $P_2O_5$ and subsequently weighed. The dried material was a white crystalline product which weighed about 1,000 grams. It had a melting point of 113° C. to 114° C.; it was soluble in water; moderately soluble in methanol and ethanol; and insoluble in non-polar organic solvents. Chemical analysis of the tris (hydroxymethyl) methylammonium salicylate showed C of 50.73, 50.83% (calc. 50.96%), H of 6.64, 6.79% (calc. 6.61%); and N of 5.34, 5.46, 5.46% (calc. 5.40%).

EXAMPLE 2

*Preparation of tris (hydroxymethyl) methylammonium acetylsalicylate*

One-tenth (0.1) mol (12 grams) of tris hydroxymethyl) methylamine were combined with 0.1 mol of acetylsalicylic acid (18 grams) and dissolved in a minimum amount of methanol. The reaction mixture was then refluxed for two hours. After refluxing, ether was added to the reaction mixture to the cloud point and the mixture was set aside to cool. Filtration and subsequent drying of the precipitate which formed in the cooled reaction mixture gave 24 grams of tris (hydroxymethyl) methylammonium acetylsalicylate. This novel ammonium compound was in the form of white needles, M.P. 109° C. to 113° C.; analysis for nitrogen showed 4.5, 4.5% N (theory 4.65% N).

EXAMPLE 3

This example shows comparative results as to the analgesic effect of aspirin and tris (hydroxymethyl) methylammonium salicylate on rats by the normal rat paw pressure method. The tests were run by administering orally to three groups of 5 rats in each group (total of 15 rats) 100 milligrams of aspirin per kilogram weight of each animal and by administering to three different groups of 5 rats in each group (total of 15 rats) 100 milligrams of tris (hydroxymethyl) methylammonium salicylate per kilogram weight of each animal. Pressure was applied to the paw of each animal at periodic intervals. The amount of pressure, measured in mm. of mercury at the pain response of the animal measures the analgesic effect of the compound. The higher the pressure required for a response the more effective are the analgesic properties of the compound. The tests were run by standard methods whereby the only difference in the animals was that one set of animals was fed aspirin whereas the other set of animals were fed the ammonium compound. The values given in the following table are the average pressures required to obtain a pain response from the animals used in each test.

| Time in minutes | Pressure required for response with aspirin | Pressure required for response with tris (hydroxymethyl) methylammonium salicylate |
| --- | --- | --- |
| 30 | 143 | 154 |
| 60 | 142 | 167 |
| 90 | 140 | 153 |

It can be seen from the above table that the ammonium compound is a more effective analgesic than aspirin.

EXAMPLE 4

This example shows comparative results as to the analgesic effect of aspirin and tris (hydroxymethyl) methylammonium salicylate on rats by the tail flick method. Three groups of 5 rats (total of 15 rats) were fed 200 milligrams of aspirin per kilogram weight of each animal, while three groups of 5 rats (total 15 rats) were fed 100 milligrams of the ammonium compound per kilogram weight of each animal. The tests were run under controlled conditions wherein the only variable was the analgesic administered. The tail flick method measures the time required for the rats to flick their tails upon the application of a concentrated beam of light to their tails. The results are given as the additional time required for the tail flick of animals which were fed an analgesic as compared to the time required, i.e., 4.3 seconds, for the same animals to flick their tails by the test method prior to ingestion of an analgesic. In those instances where the tail flick of the test animals was prior in time to that required for a flick prior to administration of an analgesic, the results are given as minus values.

| Time in minutes after administration of analgesic | Time for response above the control level for aspirin, seconds | Time for response above the control level for tris (hydroxymethyl) methylammonium salicylate, seconds |
| --- | --- | --- |
| 20 minutes | 0.40 | 0.80 |
| 40 minutes | minus 0.20 | 0.24 |
| 60 minutes | minus 0.40 | 0 |

It can be seen from the above results that the ammonium compound was more effective as an analgesic than aspirin, even though the animals were fed only half as much of the ammonium compound as compared to the animals which were fed aspirin.

What is claimed is:
1. Compounds having the generic formula:

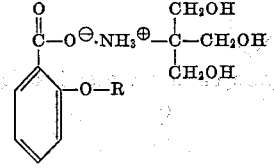

wherein R is a member selected from the group consisting of hydrogen and the

radical.

2. Tris (hydroxymethyl) methylammonium salicylate.
3. Tris (hydroxymethyl) methylammonium acetylsalicylate.

References Cited in the file of this patent
UNITED STATES PATENTS

| | | |
| --- | --- | --- |
| 1,113,742 | Berendes et al. | Oct. 13, 1914 |
| 2,101,867 | Miller et al. | Dec. 14, 1937 |
| 2,128,334 | Stockelbach | Aug. 30, 1938 |
| 2,468,012 | Isbell | Apr. 19, 1949 |
| 2,749,275 | Borsook | June 5, 1956 |
| 2,887,509 | Nash | May 19, 1959 |
| 2,903,396 | Saunders et al. | Sept. 8, 1959 |